Aug. 29, 1933.  M. J. ANDERSON  1,924,899
BRAKE MECHANISM FOR CONVEYERS
Filed Oct. 8, 1930    2 Sheets-Sheet 1
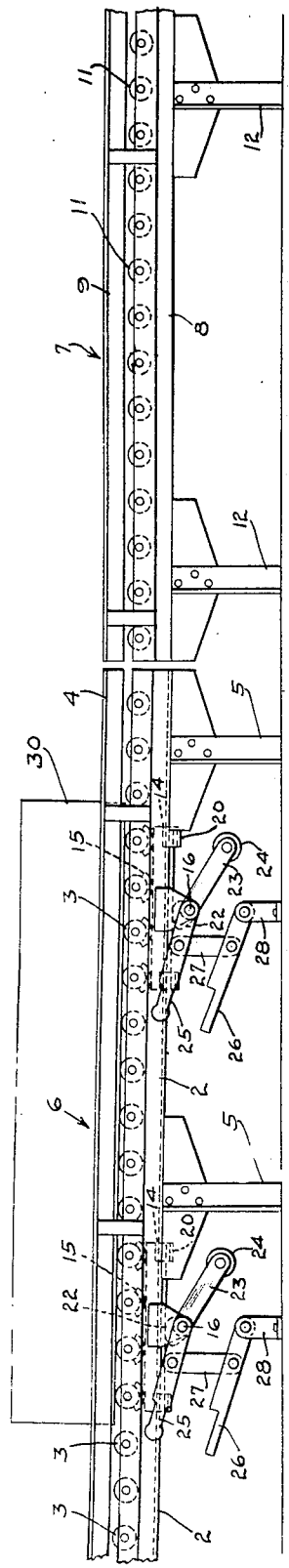
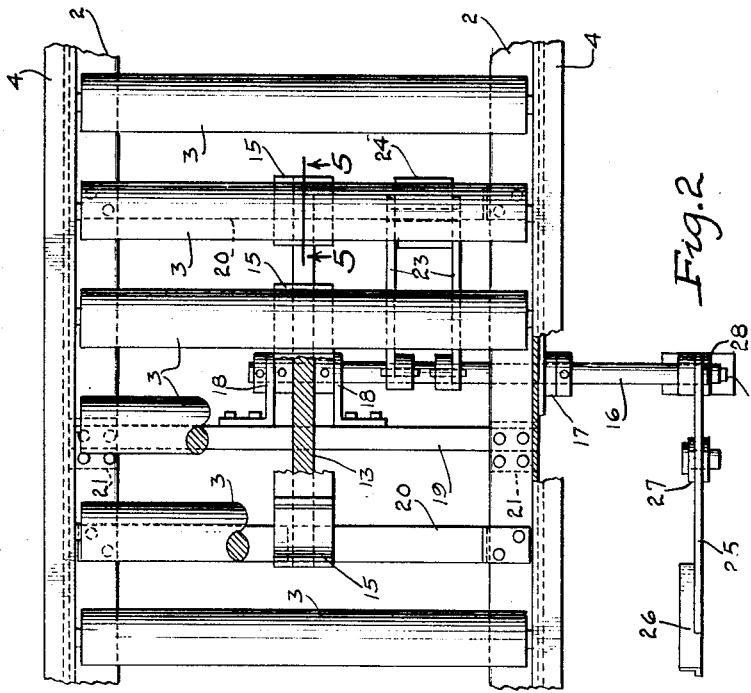
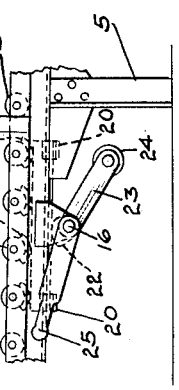
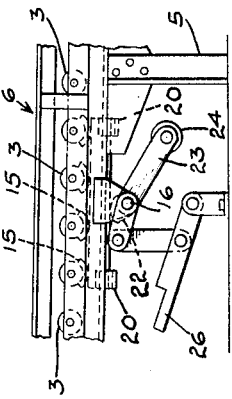
INVENTOR
MARTIN J. ANDERSON
By Paul, Paul & Moore
ATTORNEYS Aug. 29, 1933.    M. J. ANDERSON    1,924,899
BRAKE MECHANISM FOR CONVEYERS
Filed Oct. 8, 1930    2 Sheets-Sheet 2

INVENTOR
MARTIN J. ANDERSON
By Paul, Paul & Moore
ATTORNEYS

Patented Aug. 29, 1933

1,924,899

UNITED STATES PATENT OFFICE 1,924,899

BRAKE MECHANISM FOR CONVEYERS

Martin J. Anderson, Ellwood City, Pa., assignor to Mathews Conveyer Company, Ellwood City, Pa., a corporation of Pennsylvania Application October 8, 1930. Serial No. 487,228

7 Claims. (Cl. 193—35)

This invention relates to a brake mechanism adapted for use in connection with a conveyer of the roller type, to retard the rotation of certain of its rollers and thereby control the movement of commodities or articles traveling thereover.

An object of the invention is to provide in combination with a roller type conveyer, a movable member having a plurality of brake elements mounted thereon and adapted to engage certain of the conveyer rollers, and means for manually actuating said member to cause said brake elements to move into and out of operative engagement with said rollers.

A further object is to provide a brake mechanism for a roller conveyer comprising a member movably mounted beneath certain of the conveyer rollers and having means thereon adapted to engage said rollers to impede or retard their rotation, and a cross shaft mounted beneath said member and having an operative connection therewith, and a hand lever being provided for actuating said shaft, whereby said brake elements may be moved into and out of engagement with said rollers.

A further object is to provide a brake mechanism for roller conveyers including a member movably mounted beneath certain of the conveyer rollers and having a plurality of elements mounted thereon adapted to peripherally engage said rollers, means for guidingly supporting the member, a cross shaft having a cam thereon adapted to engage and actuate said member, means operatively connected with the shaft and constantly urging said member in a direction to move said elements into engagement with the rollers, a hand lever secured to the shaft, and a foot pedal operatively connected with said shaft whereby said brake mechanism may be operated by either hand or foot power.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a side elevation showing the conveyer with the invention embodied therein;

Figure 2 is an enlarged detail plan view showing a portion of a conveyer and the means for retarding the rotation of certain of its rollers;

Figure 6 is a view showing a brake mechanism adapted for hand operation only; and Figure 7 is a view showing a brake mechanism adapted to be actuated by a foot pedal.

Figure 3:
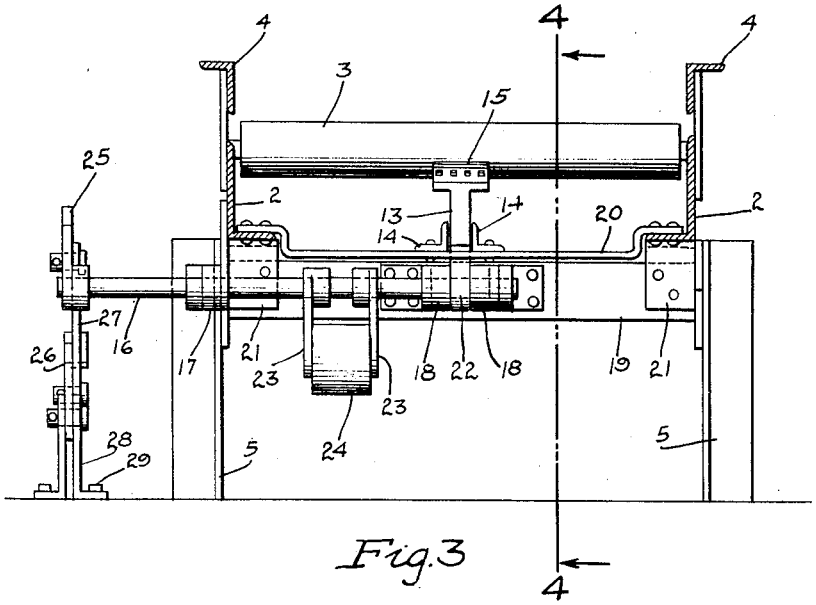
Figure 3 is a cross sectional view of the conveyer.

In the selected embodiment of the invention here shown, there is illustrated in Figure 1 a conveyer comprising spaced side rails 2—2, preferably of angle iron cross section, and having a plurality of anti-friction rollers 3 mounted thereon. Suitable guard rails 4 are secured to the side rails 2 to retain the commodities or articles upon the conveyer while the latter travel thereover. The conveyer is shown supported upon suitable standards 5, as in Figure 1. The conveyer section 6 at the left hand side of Figure 1 is arranged at a slight incline so that the articles may travel thereover by gravity, while the conveyer section 7 at the right hand side of Figure 1 is shown horizontally disposed. This section includes similar spaced side rails 8—8, guard rails 9, rollers 11, and suitable supports 12.

An important feature of the invention resides in the means provided for retarding the rotation of certain of the rollers of the conveyer to impede the travel of the commodities thereover.

Figure 4:
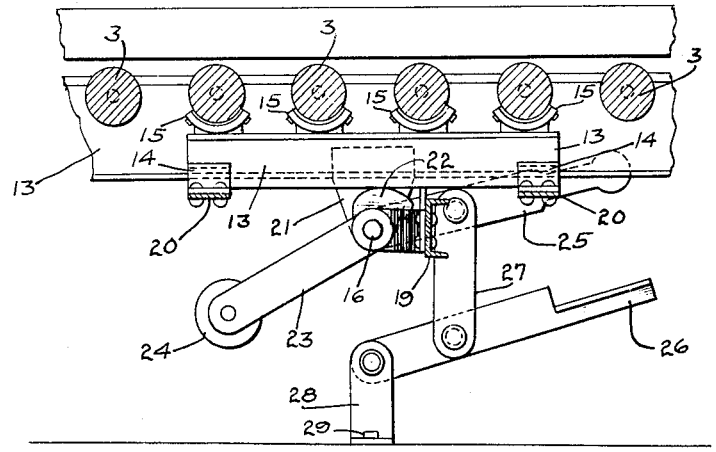
Figure 4 is a vertical sectional view on the line 4—4 of Figure 3.
Figure 5:
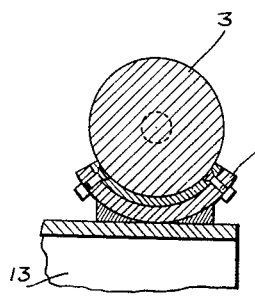
Figure 5 is an enlarged detail sectional view showing the preferred form of brake shoe.

Such means is best shown in Figures 3 and 4, and comprises a member 13 supported in suitable guides 14, whereby it may be moved towards or away from the rollers 3 beneath which it is shown mounted. The guides 14 may be secured to suitable cross-members 20, as shown in Figures 2 and 3. A plurality of brake elements 15 are secured to the member 13 and are adapted to engage the peripheries of the rollers, as best shown in Figure 5. A cross shaft 16 is shown mounted beneath the member 13 and is supported in suitable bearings 17 and 18, the former being secured to one of the side rails 2 and the latter to a cross member 19 suitably secured to the side rails 2—2 by such means as brackets 21, shown in Figures 3 and 4.

A suitable cam 22 is secured to the shaft 16 and is arranged to engage the member 13 so that when the shaft 16 is rotated in one direction, the member will be elevated to cause the brake elements to frictionally engage the rollers 13, and when said shaft is rocked in the opposite direction, the brake elements will be moved out of engagement with their respective rollers. Arms 23 are shown secured to the shaft 16 and support a counterweight 24 therebetween in a manner to constantly urge the member 13 in an upward direction to cause the brake elements to engage the rollers.

An operating lever 25 is secured to one end of the shaft 16, whereby the shaft may be manually operated to control the operation of the rollers 3 which are adapted to be engaged by the brake elements 15.

A foot pedal 26 is also provided and is shown having a link 27 connecting it with the hand lever 25. The pedal 26 is pivotally supported upon a bracket 28, secured to a suitable support such as the floor, by such means as bolts 29 shown in Figures 3 and 4.

The brake mechanism herein disclosed, is so constructed that its brake elements are normally in operative engagement with their respective rollers to prevent them from rotating. When a commodity traveling over the conveyer engages the rollers which are affected by the brake elements 15, the movement of the commodity will be impeded or interrupted. To release the article to permit it to proceed onwardly over the conveyer system, the operator will manipulate the hand lever 25 or foot pedal 26, whereby the brake elements 15 may be moved out of engagement with the rollers and thereby permit the rollers to rotate freely and allow the commodity to proceed onwardly.

When handling relatively large articles or commodities such as shown at 30 in Figure 1, it may be desirable to place two or more brake mechanisms in comparatively close relation, so that each commodity may be acted upon by two brake mechanisms, at the same time. In other installations where the commodities are relatively smaller in size and weight, the brake mechanisms may be so spaced along the conveyer that each commodity will be acted upon by a single brake mechanism at a time. By the employment of this novel brake mechanism in connection with a conveyer of the ordinary gravity roller type, the movement of the commodities over the conveyer may be controlled so as to prevent the occurrence of collisions between commodities or articles, which might result when handling commodities of different sizes and weights, it being understood that a heavy commodity may travel faster than a lighter commodity over the same gravity conveyer, and thereby overtake the latter and cause damage thereto. This invention provides means whereby the movement of the commodities over the conveyer system may be controlled, so as to positively prevent one commodity from striking against another.

Figure 6 illustrates a construction provided with a brake mechanism adapted for hand operation only. As here shown, the foot pedal 26 has been omitted, and the brake shoes 15 are adapted to be moved out of engagement with the rollers 3 by means of the hand lever 25.

Figure 7 illustrates a mechanism adapted to be actuated by means of the foot pedal 26, the hand lever having been omitted. It will thus be seen that the brake mechanism may readily be arranged for either hand or foot operation.

I claim as my invention:

1. In a conveyer including a plurality of rollers, a member mounted beneath said rollers and adapted to frictionally engage certain of said rollers, means for guidingly supporting said member, a rock shaft, a cam mounted upon said shaft and having a connecting with said member, and means for operating said shaft whereby said member may be moved into and out of frictional engagement with said certain rollers to control the movement of commodities over the conveyer.

2. In a conveyer including a plurality of rollers, a member mounted beneath said rollers and having brake elements thereon adapted to peripherally engage certain of said rollers, means for guidingly supporting said member, a rock shaft, a cam mounted upon said shaft and having a connection with said member, and means for operating said shaft whereby said brake elements may be moved into and out of frictional engagement with their respective rollers to control the operation of the conveyer.

3. In a conveyer including a plurality of rollers, a member mounted beneath said rollers and having friction elements thereon adapted to peripherally engage certain of said conveyer rollers, means for guidingly supporting said member, a rock shaft, a cam secured to the shaft and engaged with said member, a hand lever for operating said shaft whereby said friction elements may be moved into and out of frictional engagement with their respective rollers to control the operation of the conveyer, and a foot-operated means also operatively connected with said shaft whereby said friction elements may be actuated by either hand or foot control.

4. In a conveyer including a plurality of rollers, a member mounted beneath said rollers and having means thereon adapted to engage certain of said rollers to retard their rotation, means for guidingly supporting said member, a rock-shaft, a cam secured to said rock shaft and having an operative connection with the member, means secured to the shaft and constantly tending to rotate it in a direction to cause said member to move said brake elements into engagement with their respective rollers, and a foot pedal secured to the shaft whereby said member may be operated to cause the means thereon to be moved into and out of peripheral engagement with their respective rollers.

5. In a conveyer including a plurality of rollers, a member mounted beneath said rollers and having a plurality of friction elements thereon adapted to frictionally engage certain of said conveyer rollers to retard their rotation, means for guidingly supporting said member, a rock-shaft beneath the member, a cam secured to said rock shaft and engaging the member, a weight secured to the shaft and constantly urging said member in a direction to cause the brake elements to engage their respective rollers and retard their rotation, a hand lever secured to the shaft whereby said member may be actuated to manually move said elements into and out of engagement with their respective rollers, and a foot pedal operatively connected with said handle whereby the member may be operated by either hand or foot power.

6. A brake mechanism for a gravity roller conveyer including a plurality of spaced rollers, said brake mechanism comprising a member disposed beneath said conveyer rollers and carrying a plurality of brake elements each adapted to frictionally engage a roller of said conveyer, upright guides for said member, a rock shaft, a cam secured on the rock shaft and engaged with said member and adapted to vertically move said member into an operative position when the shaft is rotated in one direction, and to move said member into an inoperative position, when the shaft is rotated in the opposite direction, and a hand lever secured to said rock shaft for manually operating it.

7. A brake mechanism for a gravity roller conveyer including a plurality of spaced rollers, said brake mechanism comprising a member disposed beneath said conveyer rollers and carrying a plurality of brake elements each adapted to frictionally engage a roller of said conveyer, upright guides for said member, a rock shaft, a cam secured on the rock shaft and engaged with said member and adapted to vertically move said member into an inoperative position, when the shaft is rotated in one direction, and to move said member into an operative position, when the shaft is rotated in the opposite direction, a hand lever secured to said rock shaft for manually operating it, a foot lever, and a link operatively connecting said foot lever with the hand lever whereby the brake mechanism may be manually actuated by either hand or foot power.

MARTIN J. ANDERSON.